United States Patent [19]
Murakami

[11] 4,077,255
[45] Mar. 7, 1978

[54] ROLLER TYPE CHASSIS DYNAMOMETER

[75] Inventor: Tadao Murakami, Katsuta, Japan

[73] Assignee: Hitachi, Ltd., Japan

[21] Appl. No.: 733,796

[22] Filed: Oct. 19, 1976

[30] Foreign Application Priority Data

Oct. 24, 1975 Japan .................................. 50-127457
Jun. 28, 1976 Japan .................................. 51-75519

[51] Int. Cl.² .............................................. G01L 5/13
[52] U.S. Cl. .................................................... 73/117
[58] Field of Search .................. 73/117, 126, 123, 134

[56] References Cited

U.S. PATENT DOCUMENTS 2,973,640  3/1961  Diesfeld .................................. 73/134

FOREIGN PATENT DOCUMENTS 536,766  1/1930  Germany ............................... 73/117

*Primary Examiner*—Jerry W. Myracle
*Attorney, Agent, or Firm*—Craig & Antonelli

[57] ABSTRACT

A roller type chassis dynamometer includes: a hollow roller to be driven by a material to be inspected; a rotatable shaft having its axis extending in concentric alignment with the axis of the hollow roller and having its outer peripheral surface which defines an annular space therearound with the inner peripheral surface of the hollow roller; a power absorbing means positioned within the annular space and secured on said rotatable shaft, the power absorbing means absorbing a power to be transmitted to the roller; and detecting means associated with the rotatable shaft for detecting a power absorbed in the power absorbing means, the power absorbing means having an exciting coil provided with a lead wire running through an axial bore extending through the rotatable shaft, to the exterior of the dynamometer, to be connected to a power source, whereby the exciting coil may produce a given braking torque by controlling an electric current to be supplied thereto, commensurate with the actual condition of a material being inspected, and then the torque thus produced is directly measured by the detecting means.

8 Claims, 9 Drawing Figures

ROLLER TYPE CHASSIS DYNAMOMETER

BACKGROUND OF THE INVENTION

This invention relates to a roller type chassis dynamometer, and more particularly to a roller type chassis dynamometer equipped with a power absorbing means within the roller.

Hitherto, various roller type chassis dynamometers have been proposed for inspecting various functions and performances, such as a horse power of an engine, drive force, fuel consumption rate, acceleration and coasting performances, sound and the like. Known among these are water braking type, dynamic braking type and eddy current braking type dynamometers. However, either of these braking types uses a belt for its coupling to the aforesaid roller or is coupled thereto through the medium of a power transmitting means such as a chain, thus resulting in an increase in area for setting same. In addition, a power absorbing means is generally set on a floor, thereby obstructing the way, and hence such a means is not preferable from viewpoints of maintenance and periodic check.

SUMMARY OF THE INVENTION

It is an object of the present invention to provide a roller type chassis dynamometer which provides a minimized setting area by providing a power absorbing means interiorly of a roller, and in which a power absorbing means is not provided separately of the dynamometer.

It is another object of the invention to provide a roller type chassis dynamometer which may effectively discharge to the exterior thereof the heat which has been generated within the roller.

According to the present invention, there is provided a roller type chassis dynamometer which includes: a hollow cylindrical roller driven by means of a material to be inspected and having at least one end thereof which is rotatably supported; a rotatable shaft having its axis extending in concentric alignment with the rotational axis of the roller and having at least one end thereof which is rotatably supported relative to the hollow roller, the outer peripheral surface of the aforesaid shaft defining an annular space therearound with the inner peripheral surface of the hollow roller; means positioned within the annular space and secured on the shaft for absorbing a power to be transmitted to the roller; and detecting means associated with the rotatable shaft for detecting a power absorbed in the power asborbing means.

The roller type chassis dynamometer according to the present invention should preferably include a cooling means positioned in the aforesaid annular space and mounted on the rotatable shaft in a rotatable manner about the axis of the shaft for forcibly flowing a cooling fluid through the aforesaid annular space.

DESCRIPTION OF THE PREFERRED EMBODIMENT

Figure 1:
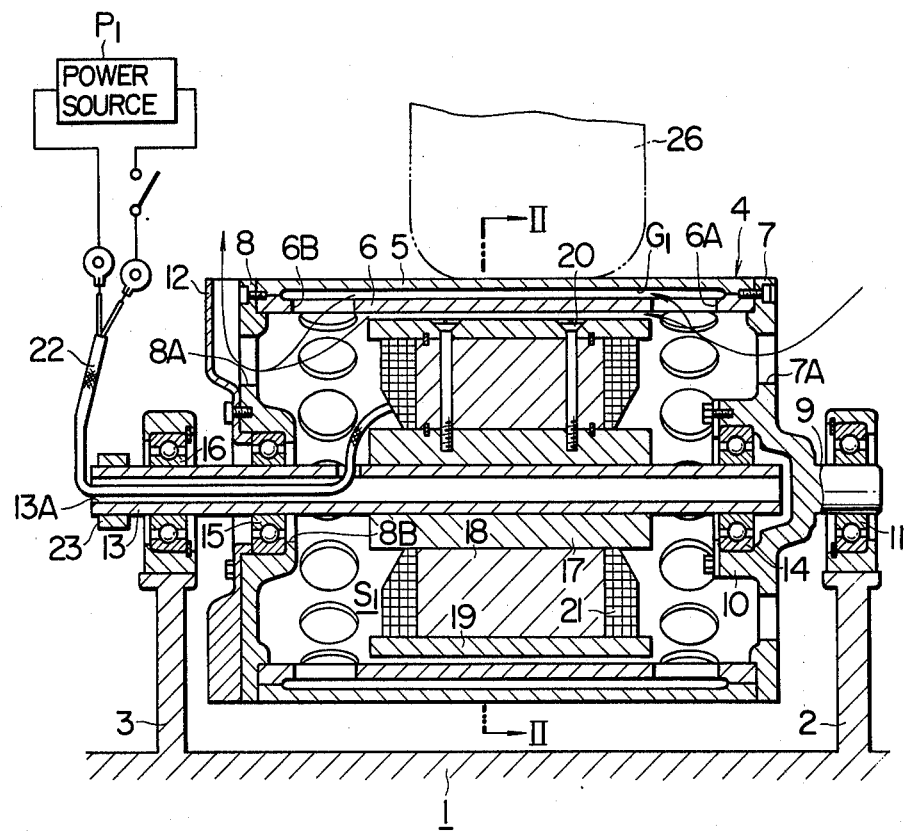
FIG. 1 is a longitudinal cross sectional view showing half of one embodiment of the present invention.
Figure 2:
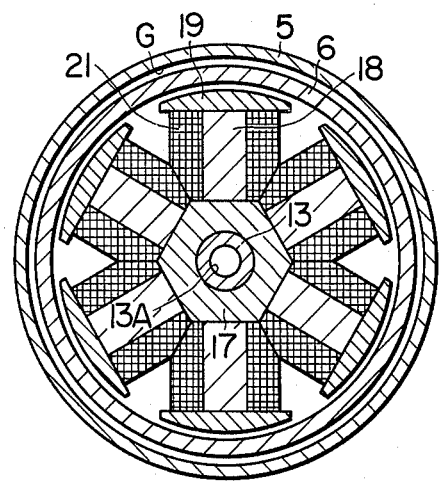
FIG. 2 is a cross-sectional view taken along the line II—II of FIG. 1.
Figure 3:
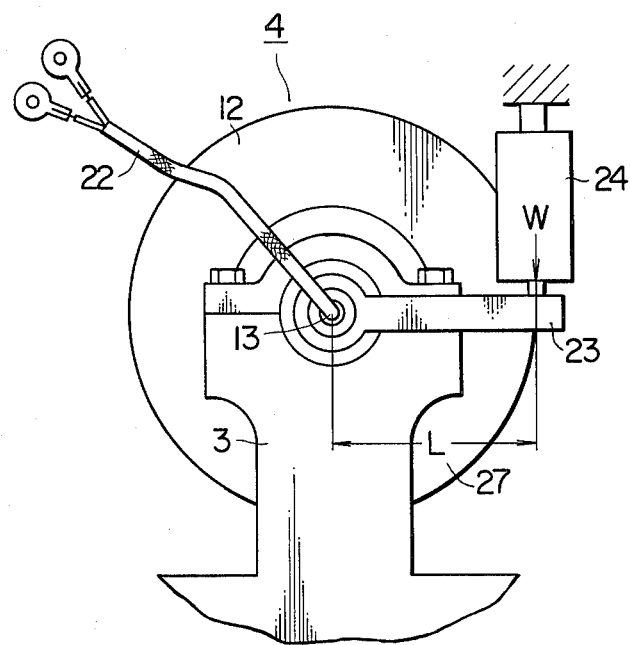
FIG. 3 is a side view of FIG. 1.

The objects and features of the present invention will now be described in more detail in conjunction with the accompanying drawings which indicate embodiments of the invention. FIGS. 1 to 4 show one embodiment of a roller type chassis dynamometer according to the invention. The chassis dynamometer includes a roller 4 having an outer ring 5 and an inner ring 6 which are made of an iron. The inner ring 6 is radially spaced a given clearance (i.e., an annular gap $G_1$) from the outer ring 5 in concentric relation thereto, with the opposite ends of the rings being welded together. The inner ring 6 is provided in its periphery adjacent to the opposite ends of the roller 4 with ventilating through holes 6A and 6B which are circumferentially equi-distantly spaced apart from each other. Secured to the opposite ends of the roller 4 by means of screws are end brackets 7 and 8, one of the brackets 7 being formed with a bearing portion 10 projecting outwardly along the axis of the roller 4. A stud shaft 9 is rotatably supported in a bearing 11 which in turn is mounted on a post 2 on a base 1. The other bracket 8 is provided with a through-hole 8B in its center and has a cooling fan 12 secured to the outer side of the bracket 8. The end brackets 7 and 8 are respectively provided with cooling-air inlet ports 7A and outlet ports 8A communicated with the aforesaid ventilating through-holes 6A and 6B. A hollow shaft 13 is rotatably supported at its one end in a bearing 14 supported in the bearing portion 10 formed on the end bracket 7, while the other end of the shaft 13 supports the end bracket 8 through the medium of a bearing 15, and is supported through the medium of a bearing 16 on a post 3 on the base 1, rotatably. An annular space (S1) is defined between the outer peripheral surface of the rotatable shaft 13 and the inner peripheral surface of the inner ring 6. As shown, a yoke 17 having a hexagonal cross section is press-fitted on the shaft 13 in its central portion. Secured to the yoke 17 by means of tightening bolts 20 from outwardly are magnetic poles 18 which are disposed radially, and magnetic pole pieces 19 which are radially spaced a minute clearance from the inner peripheral surface of the inner ring 6 of the roller 4. An exciting coil 21 is wound around the magnetic poles 18, while an input lead-wire 22 is led through an hollow portion 13A to the exterior of the device to be connected to a power source P1, the aforesaid hollow portion 13A extending through the rotatable shaft 13 in its axial direction. A lever 23 is fitted on an outer projecting end portion of the rotatable shaft 13, and coupled to a load detector 24, as shown in FIG. 3. The load detector 24 measures a load W acting on the end portion of the lever 23, while a torque T may be obtained from the equation: $T = W \times L$, wherein L represents an effective length of the lever 23.

Figure 4:
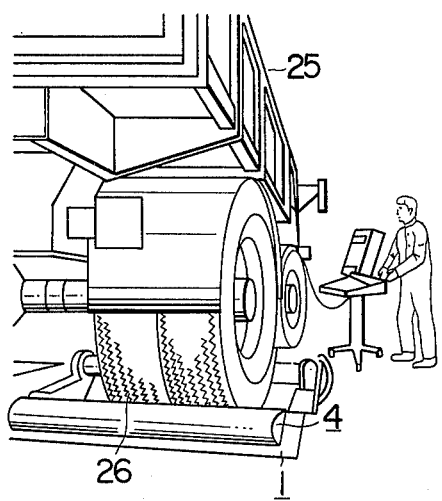
FIG. 4 is a perspective view illustrative of a measuring condition.
Figure 5:
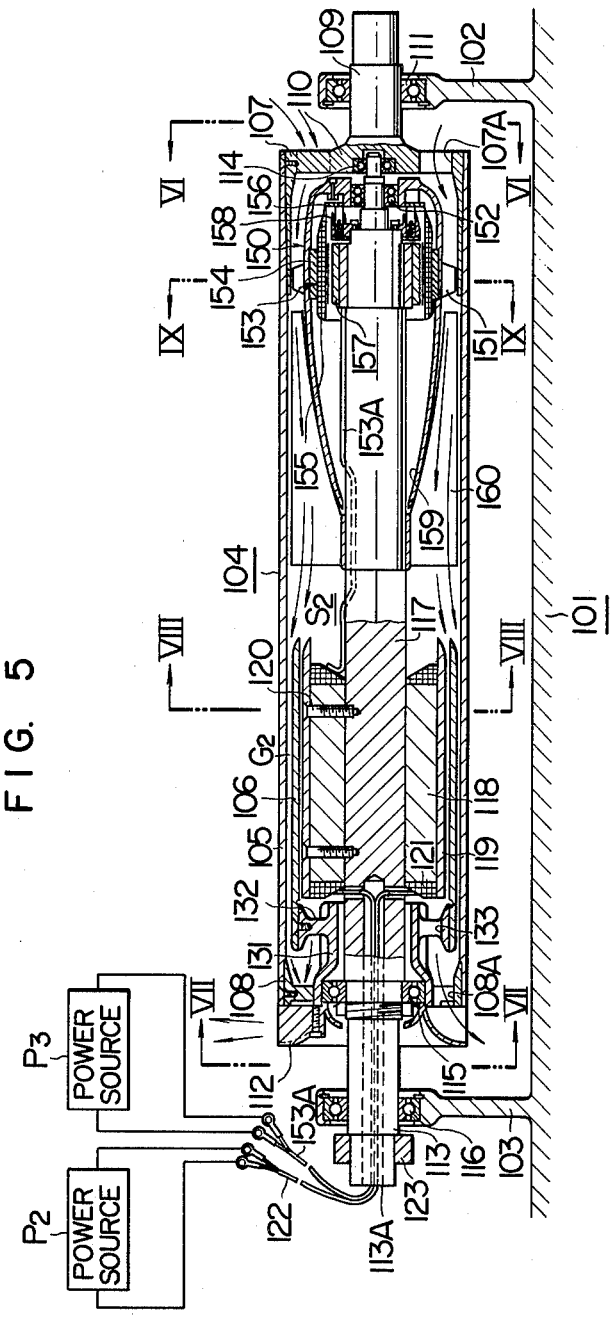
FIG. 5 is a longitudinal cross-sectional view showing half of another embodiment of the invention.

The dynamometer of the aforesaid arrangement is set on a floor as shown in FIG. 4 for measurement of a braking torque. Wheels 26 of a test automobile 25 are placed on the roller 4, and then the automobile is driven. Then, the roller begins rotating about the shaft 13 due to a rotational force of wheels 26. Then, there results a relative rotation between the roller 4 and the magnetic poles 18, so that the magnetic poles 18 may be magnetized, when an electric current is fed to the exciting coil 21 through the lead wire 22 from the power source P1 for exciting the exciting coil 21. The magnetic fluxes produced in magnetic poles constitute a closed magnetic path running from the magnetic pole piece 9 through the inner ring 6 of the roller 4 and then through an adjacent magnetic pole and yoke 17 to return to the magnetic pole piece 19.

Under these conditions, the relative movement results between the inner ring 6 of the roller 4 and the magnetic poles 19, so that an eddy current flows through the inner ring 6 according to electromagnetic inducing action, and thus a braking torque is produced in the roller according to the interaction of an eddy current and magnetic poles. The braking torque is transmitted through the rotatable shaft 13 and lever 23 to the load detector 24 for detection and measurement. The braking energy produced in the roller 4 is converted into a thermal energy to raise the temperature of the inner ring 6. However, the heat will not readily be transmitted to the outer ring 5, because of the presence of the clearance $G_1$ between the outer ring 5 and the inner ring 6. In addition, cooling air is forcibly supplied through the space (S1) by the cooling fan 12, so that heat may be effectively discharged from the surface of the inner ring 6 to the exterior of the roller.

The exciting coil 21 may produce a barking torque commensurate with various conditions, when a current to be supplied thereto is controlled on the basis of commensurate with the actual travelling condition of a vehicle, thereby providing a reasonable means to this end.

With the chassis dynamometer of the aforesaid arrangement, a power absorbing means is housed within the annular space S1, so that a space required therefor is minimized, and a compact construction may be achieved. In addition, the power absorbing means is not exposed to atmosphere, i.e., positioned internally of the dynamometer, presenting a high level of safety. In addition, a lead wire 22 may be directly led out from the interior of the roller 4 which is rotating, so that a simple construction and reliability of wiring may both be achieved. Still furthermore, the roller 4 is of a hollow construction, and then a coolant is introduced into an annular space S1, so that a temperature rise of the outer ring of the roller may be suppressed, thus avoiding adverse effect of heat on tires of an automobile being inspected. Yet furthermore, an improved cooling effect permits an increase in absorbing-energy density for a power absorbing means.

Furthermore, a torque resulting from power absorption may be directly measured by means of the lever 23 or may be directly measured by means of a torsion lever attached to the dynamometer, so that a simple construction may be achieved, as compared with those of other equipments of this type, with the accompanying accuracy in measurements. For instance, a roller is removed from an existing speed meter tester in a vehicle-testing facility and, instead, the roller of a chassis dynamometer according to the invention is attached thereto, thereby modifying the speed meter tester into a chassis dynamometer for common use with the speed meter tester.

Figure 6:
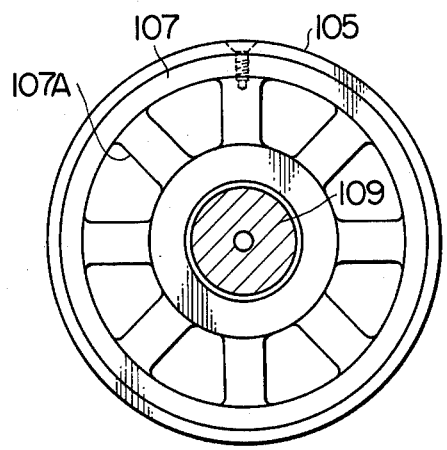
FIG. 6 is a cross-sectional view taken along the line VI—VI of FIG. 5.
Figure 7:
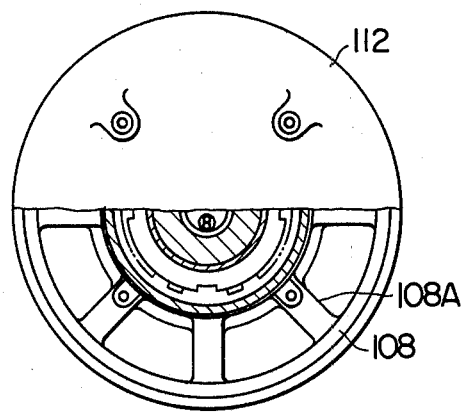
FIG. 7 is a cross-sectional view taken along the line VII—VII of FIG. 5.
Figure 8:
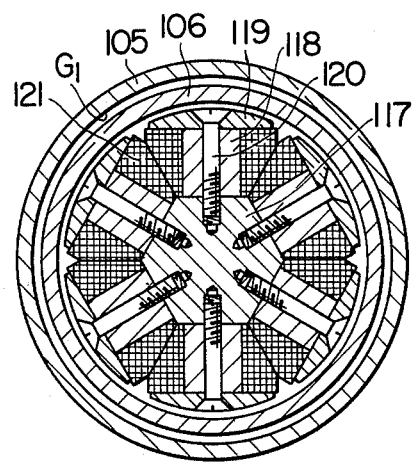
FIG. 8 is a cross-sectional view taken along the line VIII—VIII of FIG. 5.
Figure 9:
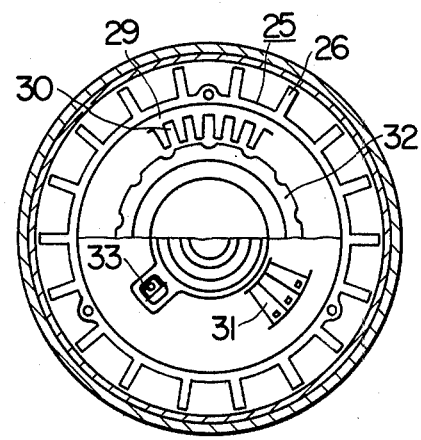
FIG. 9 is a cross-sectional view taken along the line IX—IX of FIG. 5.

FIGS. 5 to 9 show another embodiment of a chassis dynamometer according to the invention. The chassis dynamometer includes a cylindrical roller 104 which is made of an iron and has open ends. End brackets 107, 108 are secured to the aforesaid open ends of the roller 104 by means of screws to close same. The end bracket 107 is formed with a stud shaft 109 projecting outwardly of the bracket 107 along its axial direction, and a bearing portion 110 internally thereof. The stud shaft 109 is rotatably supported in a bearing 111 mounted on a post 102 on a base 101. As shown in FIG. 6, the bracket 107 is provided with ventilating through-holes 107A which are angularly equi-distantly spaced apart from each other. The end bracket 108 is provided with a hole, into which an outer race of a bearing 115 is rigidly fitted. Secured to the outer surface of the end bracket 108 by means of screws is cooling fans 112. As shown in FIG. 7, the end bracket 108 is provided with ventilating through-holes 108A which are angularly equi-distantly spaced apart from each other. The end bracket 108 is formed with a cylindrical flange 131 projecting interiorly from the inner surface thereof, while a boss 132 is formed on the outer peripheral surface of the cylindrical flange 131. The boss 132 is provided with through-holes 133 which are angularly equi-distantly spaced apart from each other. One end of the iron cylindrical member 106 is secured to the outer peripheral surface of the boss 132 by means of screws, while the outer peripheral surface of the cylindrical member 106 is radially spaced a given clearance or gap (G2) from the inner peripheral surface of the roller 104. The shaft 113 is rotatably supported at its one end in a bearing 114 mounted in a bearing portion 110 formed on the end bracket 107, while the other end of the shaft 113 supports the end bracket 108 through the medium of a bearing 115 and is rotatably supported in a bearing 116 mounted on a post 103 on a base 101. An annular space (S2) is defined between the outer peripheral surface of the rotatable shaft 113 and the inner peripheral surface of the roller 104. As shown in FIG. 8, the rotatable shaft 113 is formed with a yoke portion 117 of a hexagonal cross section. Secured to the yoke portion 117 from outside by means of screws 120 are magnetic poles 118 disposed radially, and magnetic pole pieces 119 which are spaced a small clearance from the inner peripheral surface of the cylindrical member 106. An exciting coil 121 is wound around magnetic poles 118, while an input lead wire 112 is led to the exterior of the dynamometer through an axial hollow portion 113A running through the shaft 113 in its axial direction, thereby being connected to an electric power source P2. A lever 123 is fitted on an outer projecting portion of the rotatable shaft 113A, and coupled to a load detector such as shown in FIG. 3.

An axial flow blower which is generally shown at 150 is mounted on the rotatable shaft 113. The axial flow blower 150 is provided with rotor vanes of blades 151 and supported in the vicinity of one end of the rotatable shaft 113. The blower 150 is driven by an outer-shell-rotatable type electric motor 153 supported in a bearing 152. The electric motor 153 includes an armature core 154, in which an armature coil 155 is wound around a core. The coil 155 is connected at its one end to a commutator 156 which rotates at the same r.p.m. as that of the armature core 154. Field poles 157 of the electric motor 153 are fixedly mounted on the rotatable shaft 113, while brushes 158 maintained relative to the field poles 157 are supported in sliding contact with the commutator 156.

Positioned downstream of the rotary blades 151 is a generally conical diffuser 159 in integral relation to the rotary blades 151. In addition, several stationary blades 160 are fitted on the rotatable shaft 113 so as to prevent a swirl flow of a cooling medium.

A lead wire 153A of the electric motor 153 is led along the surface of the rotatable shaft 113 and through a hollow portion 113A extending therethrough to be led to the outside of a dynamometer, thereby being connected to a power source P3.

The power absorbing means in this embodiment apparently affords functions similar to those of the first embodiment, and thus description will be omitted except for a blower portion.

The axial flow blower 150 has no relation to the rotating movement of a roller 104, so that the blower 150 may provide an enhanced cooling effect, irrespective of the lowered rotational speed of the roller 104 and a large braking torque. In addition, even when the roller 104 is stopped, cooling air may be introduced into the annular space (S2) by the blower 150 to thereby cool the interior of the roller 104.

In addition, a blower 150 is provided within an annular space (S2) between the roller 104 and the rotatable shaft 113, thus minimizing the size of a dynamometer. In addition, when the roller 104 is rotated due to a drive force given thereto, a friction-loss torque at the bearings 111, 114 and 152 are substracted from the aforesaid drive force and thus may not be detected by the rotatable shaft 113. Accordingly, when the direction of a reaction of the axial flow blower 150 is so set as to offset the aforesaid friction-loss torque, then detection of the aforesaid drive force may be well compensated for. Furthermore, the diffuser 159 rotatable in integral rotation to the rotary blades 151, and the stationary blades 160 secured on the rotatable shaft 113 prevent a swirl flow of a cooling medium fed from the blower 150, thereby effectively discharging the heat produced in the cylindrical member 106 positioned interiorly of the roller, to the outside of the roller 104.

As is apparent from the foregoing description, the roller type chassis dynamometer according to the invention provides a simple construction and permits accurate measurements, with the accompanying efficient cooling effect.

What is claimed is:

1. A roller type chasis dynamometer comprising:
    a hollow cylindrical roller driven by means of a material to be inspected and having at least one end which is rotatably supported wherein said hollow roller includes at least two concentric cylindrical members, with an annular clearance being defined therebetween;
    a rotatable shaft having its axis extending in concentric alignment with the rotational axis of said roller and having at least one end which is rotatably supported relative to said hollow roller, the outer peripheral surface of said shaft defining an annular space therearound with the inner peripheral surface of said hollow roller;
    means positioned within said annular space and secured on said shaft for absorbing a power to be transmitted to said roller; and
    detecting means associated with said rotatable shaft for detecting a power absorbed in said power absorbing means.

2. A roller type chassis dynamometer as set forth in claim 1, wherein said power absorbing means includes field poles secured on said rotatable shaft, and an exciting coil wound around said field poles and connected to an electric power source positioned outwardly of an assembly including said roller and said rotatable shaft.

3. A roller type chassis dynamometer, as set forth in claim 2, wherein said exciting coil has a lead means which has one end connected to said exciting coil and the other end connected to said electric power source, said rotatable shaft having a hollow portion extending along the axis of said shaft, and said lead means running through said hollow portion.

4. A roller type chassis dynamometer as set forth in claim 1, wherein said dynamometer includes a cooling means secured to said roller and rotatable jointly therewith for flowing a cooling fluid through said annular space, and wherein an inner cylindrical member of said at least two cylindrical members is provided with at least one through-hole which communicates said annular clearance with said annular space.

5. A roller type chassis dynamometer as set forth in claim 1, wherein said detecting means includes a lever having one end thereof secured on said rotatable shaft, means coupled to the other end of said lever for measuring a load acting on said lever.

6. A roller type chassis dynamometer comprising:
    a hollow cylindrical roller driven by means of a material to be inspected and having at least one end which is rotatably supported;
    a rotatable shaft having its axis extending in concentric alignment with the rotational axis of said roller and having at least one end which is rotatably supported relative to said hollow roller, the outer peripheral surface of said shaft defining an annular space therearound with the inner peripheral surface of said hollow roller;
    means positioned within said annular space and secured on said shaft for absorbing a power to be transmitted to said roller; and
    detecting means associated with said rotatable shaft for detecting a power absorbed in said power absorbing means, wherein said dynamometer includes a cooling means positioned within said annular space and mounted on said rotatable shaft in a rotatable manner about the axis of said shaft for forcibly flowing a cooling fluid through said annular space.

7. A roller type chassis dynamometer as set forth in claim 6, wherein said cooling means includes a rotor supported rotatably relative to said rotatable shaft, a diffuser coupled to said rotor, and a plurality of rotor blades on the outer periphery of said diffuser.

8. A roller type chassis dynamometer as set forth in claim 7, wherein said cooling means includes a plurality of stationary blades secured to said rotatable shaft for guiding a fluid which is being fed from said rotary blades.

* * * * *